Patented Dec. 5, 1933

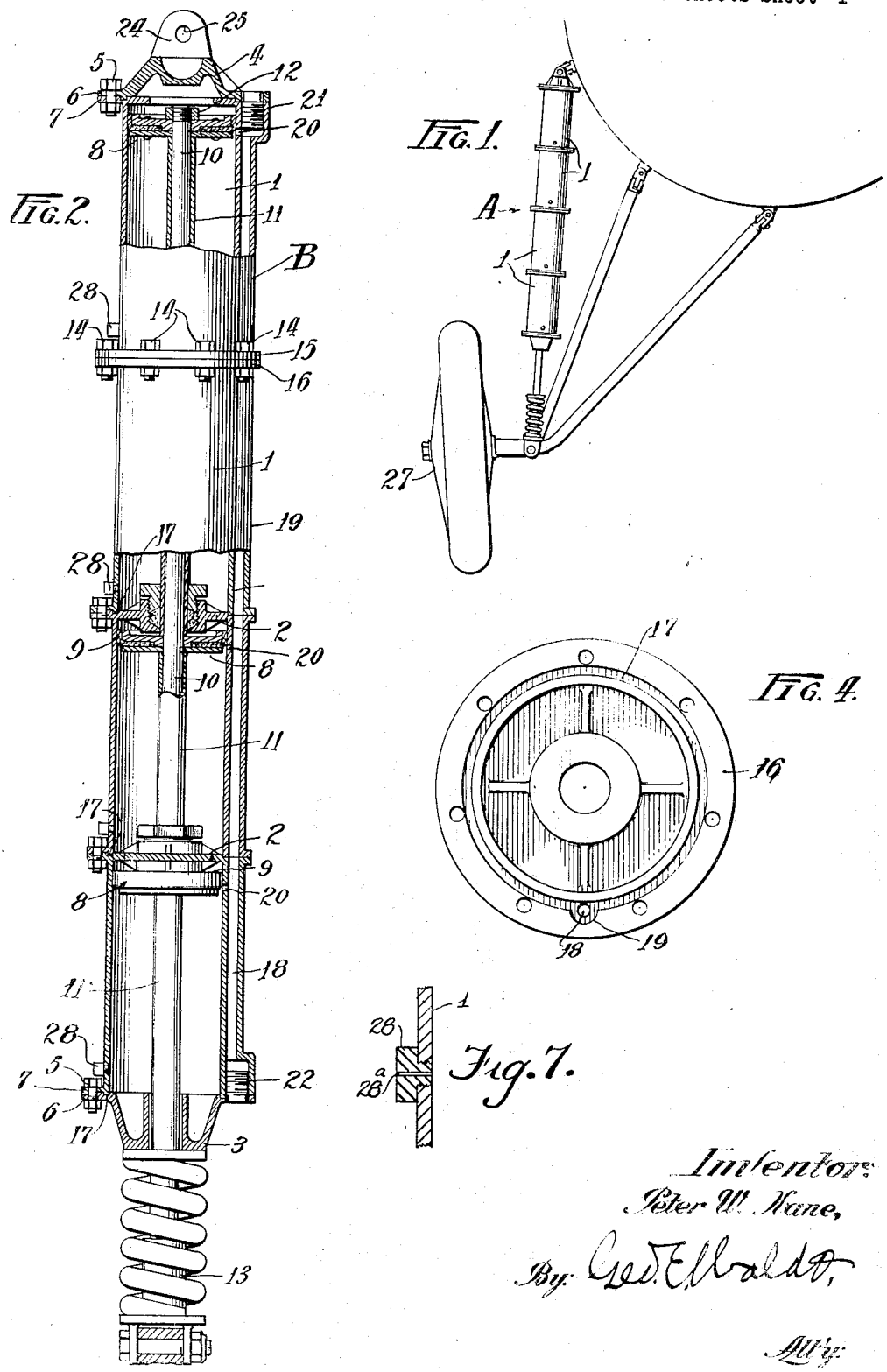

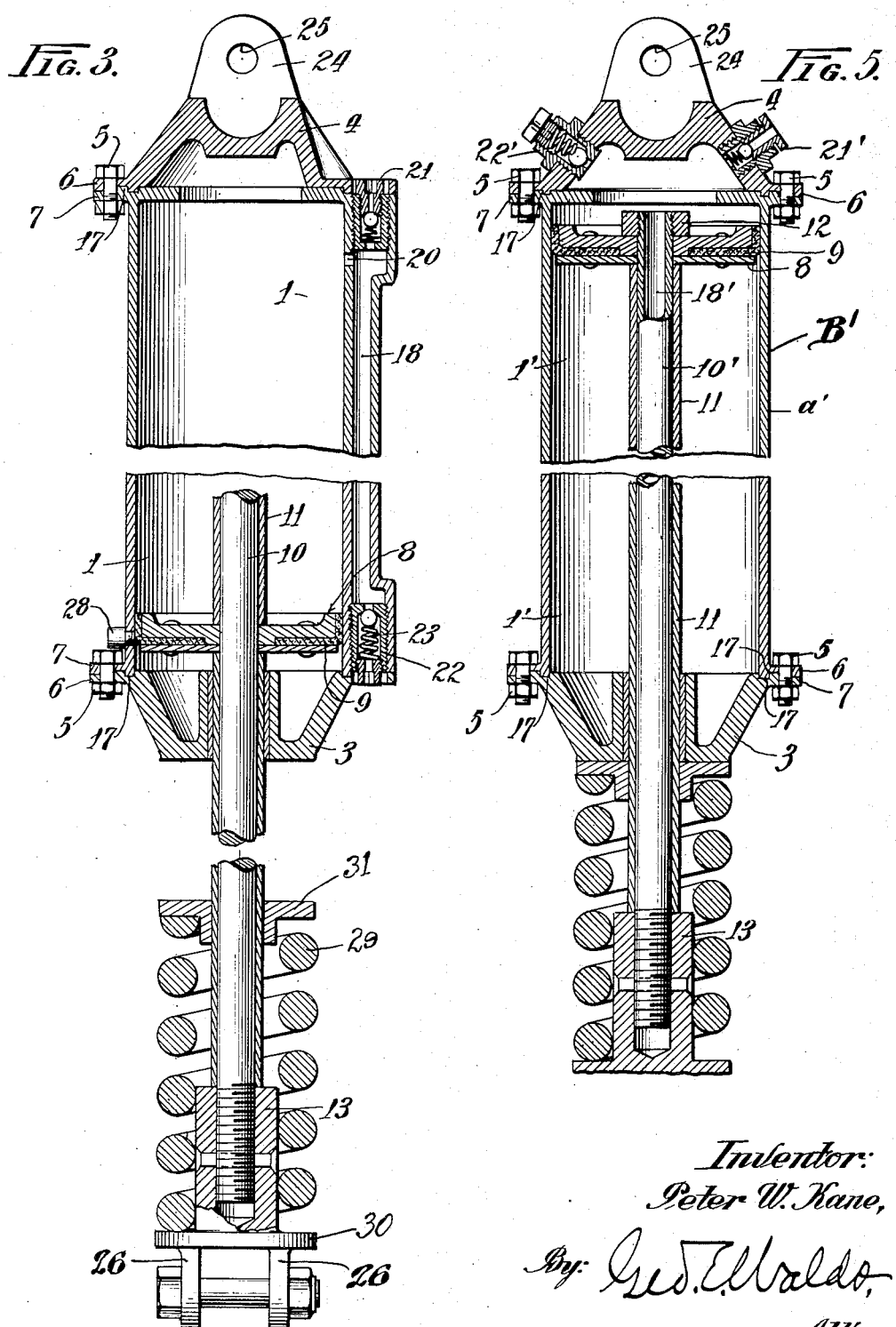

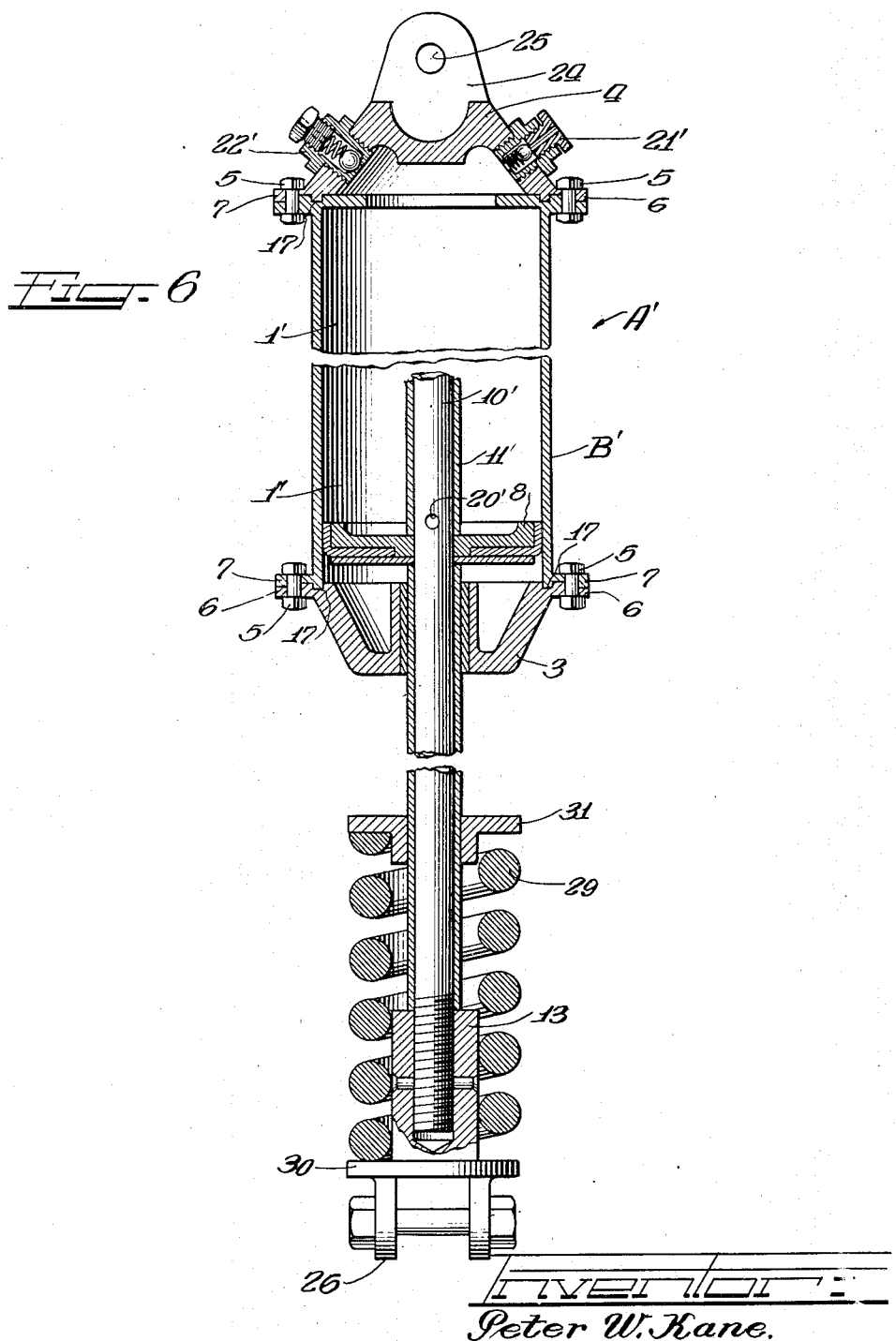

1,938,392

UNITED STATES PATENT OFFICE 1,938,392

PNEUMATIC SHOCK ABSORBER

Peter W. Kane, San Francisco, Calif.

Application May 5, 1930. Serial No. 449,953

6 Claims. (Cl. 188—88)

This invention relates to pneumatic shock absorbers, and particularly to shock absorbers for the landing gear of aeroplanes.

An important object of my invention is to provide a shock absorber capable of reducing to a safe limit the shock to which aeroplanes are subjected upon making contact with the ground in landing.

It is also an important object of my invention to provide a pneumatic shock absorber for the landing gear of aeroplanes in which recoil after impact with the ground is substantially eliminated, thereby obviating any tendency to bounce or throw the aeroplane into the air with the attendant risk of endangering the lives of the occupants thereof, and of damaging the aeroplane structure.

It is a further important object of my invention to provide pneumatic means for meeting the initial shock on impact of the landing gear of an aeroplane with the ground, and of then affording resilient load-sustaining means while the aeroplane is "taxi-ing" along the ground.

It is also a further, and important, object of my invention to provide a shock absorber for the landing gear of aeroplanes in which pneumatic means are combined with resilient spring means in such a manner that the spring means become effective after the initial shock of landing has been met by the pneumatic means, and in the event of failure of the pneumatic means.

It is also an important object of my invention to provide a shock absorber for the landing gear of aeroplanes of the utmost simplicity so that its effectiveness will not be dependent upon the proper functioning of a multiplicity of moving parts.

In the drawings:—

Figure 1 is a side view in elevation of a pneumatic shock absorber embodying the principles of my invention, and showing how it may be applied to the landing gear of an aeroplane.

Figure 2 is a vertical view of the shock absorber with parts in section and with parts in elevation to show the details of construction.

Figure 3 is a broken vertical view of the shock absorber with parts in section and parts in elevation.

Figure 4 is a plan view of an element of the shock absorber.

Figures 5 and 6 are sectional vertical views, with parts broken, of a modified construction of the absorber.

Figure 7 is an enlarged fragmentary detail section of a bleeder port.

As shown in the drawings:—

The shock absorber as a whole is indicated by the letter A, and its casing B comprises a plurality of cylinders 1, of substantially uniform length, connected end to end to provide a relatively long casing.

The ends of the casing B are closed by heads 3 and 4 which are removably secured thereto in any desired manner, as, for instance, by means of bolts 5 which extend through flanges 6, of the heads, and flanges 7 of the end of the casing.

The cylinders 1 may be connected together in any desired manner, as, by means of flanges 15 and 16 having bolts 14, passing therethrough.

The casing B is partitioned by partition members 2, inserted therein, to provide a plurality of compression chambers, and in each of these chambers there is a compression member, or piston 8.

Each piston is fitted with a suitable packing 9, as the leather cup washers shown, to prevent undue leakage of air past the piston during its upward, compression, movement.

A piston rod 10 extends in the casing B and through one end thereof, and an abutment member 13 is threaded on the outer end of the rod. A plurality of sleeves 11 are placed on the rod, and between the adjacent ends of each pair of sleeves a piston 8 is mounted on the piston rod. A claming nut 12 is threaded on the inner end of the piston rod, and it will be evident that this nut and the abutment member 13 provide means whereby the several sleeves and the pistons positioned between them are held clamped on the piston rod.

The partition members 2 which divide the casing B into a plurality of compression chambers, each consists of an integral member providing an outward flange 16, and an inwardly directed flange at the upper end of each cylinder 1, and suitably positioned in the inner flange is placed packing means through which the sleeves 11 slide. The member 2, may have a marginal groove 17 to receive the lower end of an adjacent cylinder, so that the cylinders may be held in aligned relation to each other.

The casing has an air passage 18 formed in a rib or thickened portion 19 of the wall thereof and through the flange of the partition members 2, and the ends of the passage are somewhat enlarged to receive a relief valve 22 which is pressed inwardly against its seat by a spring 23, and a check valve 21 arranged to open inwardly to admit air. The passage 18 communicates with the compression chambers through ports 20 in the wall of the cylinders, and near the upper end thereof.

The cylinder head 4 is provided with spaced lugs 24 having eyes 25 for pivotally connecting the head to the body of an aeroplane, and formed integral with the abutment member 13, on the projecting end of the piston rod 10, are a pair of lugs 26 for connecting the piston rod to the axle of a wheel 27 forming part of the landing gear of the aeroplane.

Coiled about the piston rod 10 is a spring 29 positioned between a washer 31, slidable on the sleeve 11, and an enlarged portion 30 of the abutment member 13. This spring 29 is relatively short so that it does not become compressed until the piston rod is approaching the end of its upward or compression stroke.

As the aeroplane ascends the wheel of the landing gear will descend and the piston rod and pistons will move downwardly from the position shown in Figure 2 to that shown in Figure 3. The descending pistons will, obviously, suck air through the air-intake valve 21, through the passage 18, and through the ports 20 to fill the cylinders with air. The air ahead of the descending piston is allowed to escape through small bleeder ports 28$^a$ in plugs 28 located near the bottom end of the cylinder.

When the aeroplane lands the pistons are forced upwardly against the air in the cylinder ahead of the piston and against the downward pull of the vacuum behind the piston. The spring-pressed relief valve 22 is suitably adjusted to hold the compressed air in the cylinder so that the shocks of a normal landing or of the taxi-ing of the plane over the ground are taken care of by the resilient cushion of air ahead of the piston. As the piston is forced upwardly air is drawn through the small bleeder ports to check the recoil of the landing gear. The orifice of the bleeder ports is such that upon the initial sudden movement upwardly of the piston air is not admitted fast enough to immediately fill the space behind the piston so that the pressure there is sub-atmospheric for a brief period, yet fast enough to provide for an air cushion to check movement of the piston on the return or recoil stroke.

When the shock of landing is unusually severe and the air ahead of the pistons is momentarily compressed to an unusually high value, the relief valve 22 will operate to allow air to escape until the air pressure falls to a desired value. It will be evident that in this event the pistons will advance far enough to permit the spring 29 to become compressed between the washer 31, now abutting the head 3, and the enlarged portion 30 of the member 13. Immediately after the initial unusually severe shock has been taken care of the piston rod 10 will be urged outwardly by the spring 29 so that there is an ample compression space ahead of the piston to ensure easy riding of the plane as it runs along the ground.

A modified structure is illustrated by Figures 5 and 6. Figure 5 is comparable with Figure 2 in showing the shock absorber with its pistons at the end of the upward, compression, stroke; and Figure 6 is comparable with Figure 3 in showing the pistons at the beginning of the compression stroke. The modified structure operates in the same manner as the structure already discussed. In the modified structure the passage 18 formed in the well of the casing B has been replaced by a passage 18′ extending along the piston rod 10′. The relief valve 22′ and the check valve 21′ are positioned in the upper head 4 of the casing.

To take the place of the ports 20 of Figures 2 and 3, the piston rod and the sleeve are ported at 20′ to permit the passage of air out of and into the compression spaces through the passage 18′. It is evident that the upper face of the top piston communicates directly with the valves 21′ and 22′.

It will be understood that the arrangement of the parts of the head 4 and the disposition of the valves 21′ and 22′ as shown is merely illustrative, and that these features may be readily changed provided only that the valves 21′ and 22′ are in communication with the compression spaces and the passage 18′.

I claim:

1. A shock absorber comprising an elongated casing having partition means dividing it into a plurality of compression chambers in endwise relation to each other, piston means in said chambers, means connecting said pistons for simultaneous movement in the same direction in said chambers, and valve means arranged to control the admission of air into and the discharge of air from said casing.

2. A shock absorber comprising a plurality of independent compression chambers arranged in longitudinal alinement, a piston in each chamber, a piston rod connecting said pistons for simultaneous movement in the same direction, conduit means in fluid communication with said chambers, and means operatively connected to said conduit to control the admission of a fluid into and the discharge of a fluid from said conduit.

3. A shock absorber comprising a casing having means defining a plurality of longitudinally alined compression chambers, a piston in each of said chambers, means connecting said pistons for simultaneous movement in the same direction, means defining a conduit having fluid communication with said chambers, and a pressure relief valve and an intake check valve arranged for automatically controlling fluid communication between said conduit and a source of fluid external to said casing.

4. A shock absorber comprising a casing having means defining a plurality of longitudinally alined compression chambers, a piston in each of said chambers, means connecting said pistons for simultaneous movement in the same direction, conduit means in fluid communication with each of said chambers at one end of the chambers, and pressure relief valve means and intake valve means arranged to automatically control air communication of said conduit with the atmosphere.

5. A pneumatic shock absorber comprising a casing having partition means dividing it into a plurality of compression chambers in endwise relation to each other, a piston in each of said chambers, a piston rod connecting said pistons for movement in the same direction, a head on one end of said casing, the said piston rod having a portion thereof extending from said casing and slidably mounted in said head, a ported head on the other end of the casing, a pressure relief valve and an intake valve in the last named head automatically controlling communication through said ports, of the said chambers with the atmosphere as the pistons move therein, the said piston rod being passaged for communication with said ported head, and having ports opening into said chambers adjacent to and on one side of said pistons.

6. In a pneumatic shock absorber for the landing gear of aeroplanes, a chamber having air compressing and vacuum producing means for retarding relative movement of the body of the plane and the landing gear upon initial impact of the gear with the ground, pressure relief valve means operable upon a predetermined pressure having been attained in the chamber, spring shock absorbing means operably effective after a predetermined movement of the pneumatic shock absorber, said air compressing and vacuum producing means in the chamber being effective to prevent recoil of the body of the plane, said spring means being arranged to support said body on the landing gear, when on the ground, in the absence of a compressed air cushion in the chamber.

PETER W. KANE.